July 24, 1962  P. C. TYRRELL ETAL  3,046,466
VOLTAGE REGULATED POWER SUPPLIES
Filed Nov. 3, 1958

INVENTORS
PAUL C. TYRRELL
WALLACE F. WILEY JR.
BY
ATTORNEY

United States Patent Office 3,046,466
Patented July 24, 1962

3,046,466
VOLTAGE REGULATED POWER SUPPLIES
Paul C. Tyrrell, Kansas City, Mo., and Wallace F. Wiley, Jr., Prairie Village, Kans., assignors to Wilcox Electric Company, Inc., Kansas City, Mo., a corporation of Kansas
Filed Nov. 3, 1958, Ser. No. 771,612
8 Claims. (Cl. 321—16)

This invention relates to the electrical arts and, more particularly, to improvements in power supply apparatus by which electrical power from an alternating current source thereof may be coupled, usually after alteration of the wave form or magnitude parameters of such power, to power consuming load equipment.

It is desirable, and in many applications, essential, that the voltage of electrical power fed to load equipment from a power supply be maintained substantially constant. However, a number of factors may tend to render the attainment of such desired result difficult or impossible unless special regulating means are employed. Among such factors, those of particular interest in connection with the present invention are, firstly, that the amount of electrical current drawn by many types of power consuming load equipment characteristically varies at different times or with changes of other conditions affecting such load equipment, and secondly, most types of power supplies and the power sources coupled therewith characteristically have internal impedances of their own through which varying amounts of current flow will produce correspondingly varying voltage drops affecting the actual output voltage of the power supply as a function of the amount of current being drawn by the load equipment coupled therewith. As known to those skilled in the art, such internal impedances affecting output voltage normally include the effective resistance presented by the discharging of, or limitations upon the charge holding capabilities of, capacitors of practicable size (which is usually of greatest significance), as well as the effective forward resistance of a series rectifier (which is relatively high in the case of vacuum diodes), and the internal series impedance of the generator or other power source from which the power supply derives its energy (which can be fairly substantial in the case of certain special types of generators such as are used for airborne equipment).

Prior efforts to solve the problem of providing a regulated, substantially constant output voltage from power supply apparatus despite possibly wide variations in the amount of current drawn by load equipment coupled therewith have been characterized by the employment of relatively complex and difficult to adjust arrangements requiring either a relatively great number or special types of components rendering the regulatory means unduly expensive.

It is the primary object of this invention to provide relatively simple and inexpensive, although extremely efficient and reliable, means for use in electrical power supply apparatus by which the voltage output of the latter may be effectively regulated and maintained substantially constant even though the current drawn by the load equipment coupled to the power supply apparatus may vary through a comparatively wide range.

It is another important object of this invention to provide such improved regulating means which employs a resonant inductance-capacitance circuit utilizing a variable inductance in the form of a swinging choke whose inductive reactance varies as a function of the amount of electrical current passing therethrough, with the frequency of the alternating current source falling on one of the side or off-resonance slopes of the resonance response characteristics of the resonant circuit in such manner that, as the inductance of the swinging choke varies with the current drawn by the load equipment, the response characteristics of the resonant circuit will be correspondingly shifted in frequency relative to the frequency of the alternating current source to compensate for changes in voltage drop across the internal impedance of the source and supply also resulting from variations in current drawn by the load equipment.

It is another important object of this invention to utilize such resonant circuit compensating means in the input circuit of the power supply.

It is another important object of the invention to provide such regulating means which are particularly useful because of their adaptability for use in conjunction with power supply circuits of the type which accomplish a voltage doubling, quadrupling or other multiplying action.

Other important objects of the invention will be made clear or become apparent from the accompanying drawing and the description of illustrative embodiments of the invention which follow.

Figure 1:
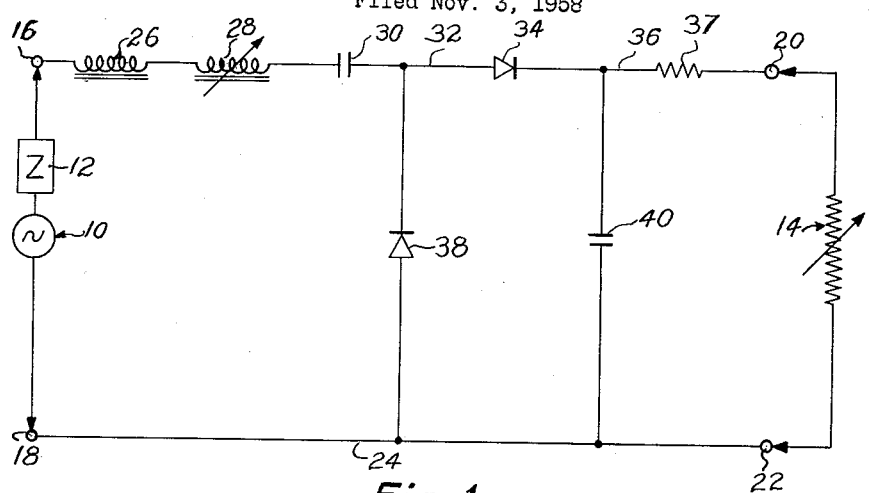
FIG. 1 is a schematic diagram showing an embodiment of the invention in which the improvements contemplated are applied to a voltage doubling, rectifying type power supply.
Figure 5:
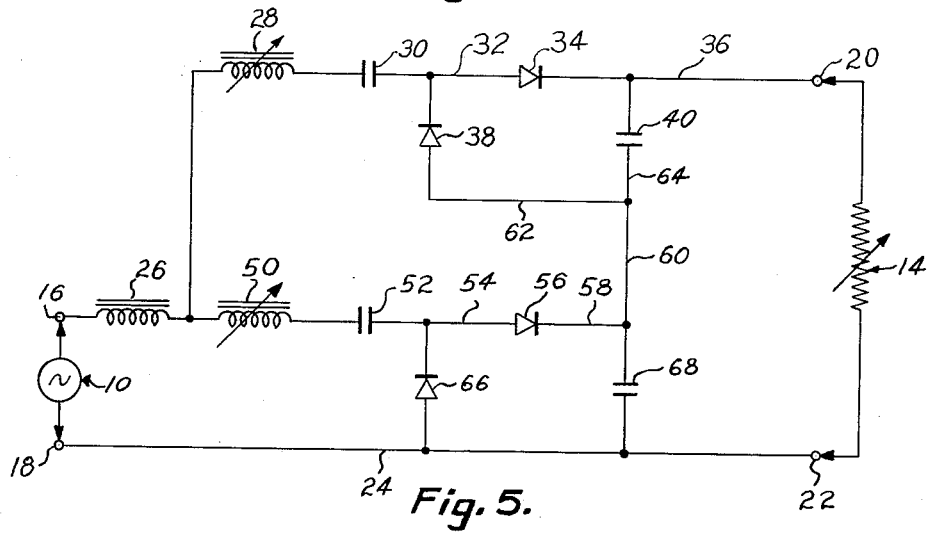
Figure 4:
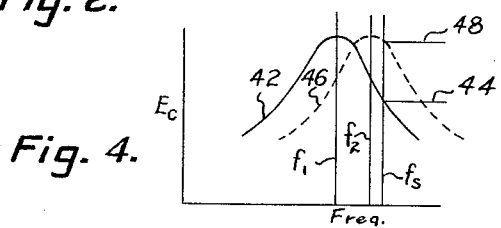

FIG. 4 is a graphic representation showing the relationship between the amount of electrical voltage appearing across the capacitor portion of the resonant regulating circuit at differing frequencies of resonance of such resonant circuit, such as occur with changes in the value of the inductive reactance portion of such circuit with variations in current drawn by the load equipment, in a power supply arrangement such as that of FIG. 1; and FIG. 5 is a schematic diagram showing another embodiment of the invention in which the improvements contemplated are applied to a voltage quadrupling, rectifying type power supply.

Referring first to the preferred embodiment illustrated in FIG. 1, the numeral 10 generally designates an alternating current power source, which might be a generator, an alternator, a transformer secondary or the like, having an internal series impedance separately indicated for clarity of explanation in FIG. 1 and designated by the numeral 12. The numeral 14 generally designates power consuming load equipment of any type whose current requirements may vary from time-to-time or in response to various conditions, the symbol for a variable resistance having been used in FIG. 1 by virtue of its general analogy in the respects in question to load equipment having variable current requirements.

The power supply apparatus itself includes a pair of input terminals 16 and 18 between which the alternating current power source 10 is adapted to be coupled, and a pair of output terminals 20 and 22 across which the load equipment 14 is adapted to be coupled.

In the illustrative embodiment under consideration, the input terminal 18 is directly coupled with the output terminal 22 by conductive means 24. The input terminal 16 is coupled with the output terminal 20 by a series circuit included in the order named and proceeding from input terminal 16 to output terminal 20, a fixed choke 26 having a substantially constant inductive reactance for the load currents to be handled, a swinging choke 28 whose inductive reactance varies (i.e., decreases), as the amount of electrical current passed therethrough is increased, a series, input capacitor 30, conductive means 32, a series rectifier device 34, and conductive means 36. A shunt rectifier device 38 is coupled between the conductive means 32 and the conductive means 24. A shunt, output capacitor 40 is coupled between the conductive means 36 and the conductive means 24.

The rectifier device 34 itself has some forward resistance to flow of current therethrough. Such resistance of device 34 is shown as lumped with another virtual resistance of normally much greater effect resulting from practical limitations upon the amount of charge that can be retained by the capacitors 30 and 40 when of practicable capacitance values, such combined effective resistances being represented for explanatory purposes in FIG. 1 by the resistance symbol 37 in series with conductive means 36.

It may be observed that the fixed choke 26 and the swinging choke 28 may be conventional and readily available components of those types having the proper reactance characteristics determined as mentioned hereinafter, the capacitors 30 and 40 may be conventional and readily available condensors such as normally used in power supplies and of reactance values determinable as hereinafter discussed, and the rectifier devices 34 and 38 may be of any suitable types adapted for handling the voltage and current requirements to be provided in the power supply for powering the load equipment 14, common types of such rectifier devices including those of the dry disc copper oxide type, vacuum tube diodes, etc. It should also be pointed out that conventional ripple filtering means may be provided, if desired, in series with the conductive means 36 and between the conductive means 36 and the conductive means 24; however, since such ripple filtering structure forms no part of the present invention, and its employment when required is conventional with those skilled in the art, such means have not been illustrated.

It will be observed by those skilled in the art that the provisions and arrangement of the rectifier devices 34 and 38 and the output capacitor 40 is essentially conventional in a voltage doubling power supply. It will, therefore, be apparent that the improvements to such apparatus contemplated by the present invention involve the provision, in combination with such conventional parts, of the chokes 26 and 28 and the capacitor 30 in series with one of the input leads of the power supply, together with the choice and utilization of the reactances of such chokes 26 and 28 and capacitor 30 to provide a series resonant circuit whose resonance characteristics can be employed to achieve the regulatory function now to be further described.

For explanation purposes, let it first be assumed that the chokes 26 and 28 are bridged across or replaced by a wire or other low impedance conductor. It will then be clear that, as the effective resistance of the load equipment 14 varies, the current consumed by the latter and, therefore, flowing around the entire circuit from source 10 to input terminal 16, to output terminal 20 through load equipment 14, to output terminal 22, to input terminal 18 and back to source 10, will also vary. From this, it inevitably follows that the voltage drop occuring across the effective internal resistance 37 of the power supply and the internal impedance 12 of the source 10, will also vary. Accordingly, in the absence of the provision of the regulatory means 26, 28 and 30, contemplated by this invention, an increase in effective resistance of the load equipment 14 will result in decreased current flow and decreased voltage drop across the just mentioned internal impedances, thereby ultimately presenting at the output terminals 20 and 22 an increased voltage. When the effective resistance of the load equipment 14 decreases, the opposite effects occur, and the voltage presented at output terminals 20 and 22 falls below the normal or desired value thereof.

Figure 2:
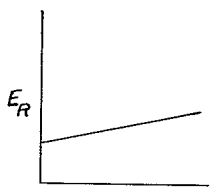
FIG. 2 is a graphic representation of the general relationship between current drawn by the load equipment and the voltage drop across the resistive component of the internal impedance of an alternating current source and associated power supply structure in a power supply arrangement such as that of FIG. 1.
Figure 3:
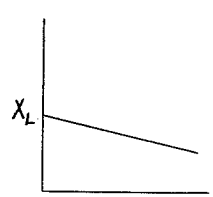
FIG. 3 is a graphic representation of the general relationship between current drawn by the load equipment and the magnitude of the inductive reactance in the resonant regulating circuit in a power supply arrangement such as that of FIG. 1.

The effect of increasing load current (designated $I_L$) upon the voltage drop across the source resistance 12 and supply resistance 37 (designated $E_R$) is graphically illustrated in FIG. 2. To understand the manner of operation of the regulatory means 26, 28 and 30 contemplated by this invention, the effect of varying current flow through swinging chokes must be recognized. In this regard, reference is made to FIG. 3, wherein is graphically represented the fact that, as the amount of current flowing through a swinging choke such as 28, or a series combination of a fixed choke and a swinging choke such as at 26 and 28 (designated $I_X$) increases, the inductive reactance (designated $X_L$) will decrease in a normal type of swinging choke.

It will now be clear that, since the series combination of the inductive reactance of the chokes 26 and 28 with the capacitive reactance of the capacitor 30 will resonate at a predeterminable frequency, depending upon the values of the reactances involved, and since the inductive reactance may be varied as a function of current flow, the frequency of series resonance of the inductance 26—28 with the capacitance 30 will also vary as a function of current flow. By proper choice of the reactance characteristics of the components 26, 28 and 30, as hereinafter further discussed, the series resonant frequency of the regulatory circuit 26, 28 and 30 may be caused to vary with current flow therethrough in a predetermined fashion.

Referring next to FIG. 4, the curve 42 represents the voltage appearing across the input capacitor 30, by virtue of the series resonant characteristics of the inductance-capacitance combination 26, 28 and 30 for different frequencies of alternating current voltage applied thereto when the series resonant combination 26, 28 and 30 is resonant at a frequency designated by the line $f_1$. The frequency of the alternating current output of the source 10, which may be assumed substantially constant, is designated by the line $f_s$ in FIG. 4. It will thus be clear that with an alternating current voltage of frequency $f_s$ applied to an inductance-capacitance combination 26, 28 and 30, which is series resonant to frequency $f_1$, which is below the source frequency $f_s$, the amount of voltage appearing across the capacitance 30 is at the level represented by the line 44 in FIG. 4. The dotted line curve 46 in FIG. 4 similarly represents the voltage appearing across the capacitor 30 when the series resonant frequency of the inductance-capacitance combination 26, 28 and 30 is raised to a frequency indicated by the line $f_2$. It may now be observed from the curve 46 that with the resonant frequency of the series resonant combination 26, 28 and 30, shifted to frequency $f_2$, and the frequency of the applied power still remaining at frequency $f_s$, the amount of voltage appearing across the capacitor 30 will be increased to the level indicated by the line 48 in FIG. 4.

As is well known to those skilled in the art, the voltage at any time developed across the series capacitor 30 adds to the voltage developed by the source 10 to provide the total output voltage effectively delivered to the output terminals 20 and 22. Accordingly, since it will be clear from what has been said above that the series resonant frequency of the inductive-capacitance combination 26, 28 and 30 may be shifted by changes in the inductive reactance of the swinging choke 28 resulting from changes in the current drawn by the load equipment 14, it will be apparent that, by proper choice of reactance characteristics of the components 26, 28 and 30 in the light of the characteristics of the source 10 and its output voltage and the characteristics of the load equipment 14 and its expected range of variation of the current requirements, the resonance frequency of the inductance-capacitance combination 26, 28 and 30 may be located and shifted automatically in response to changes in load current in such manner that the voltage presented across the capacitor 30 will exactly offset any alterations in the output voltage at terminals 20 and 22 which would otherwise result from changes in the voltage drop across the internal impedances 12 and 37 by virtue of the same changes in load current.

Before proceeding to a more detailed disclosure of the steps to be followed in determining the values of various components, the rather specific terms and arrangement shown and described for purposes of illustration render it advisable to make a few observations concerning the actually more generalized nature of the improvement. For example, it is not essential that a separate fixed choke 26 and swinging choke 28 be utilized; such construction is merely preferred from the standpoint of convenience in providing sufficient inductance to resonate at the frequencies usually desired while still utilizing readily available and relatively inexpensive components. Actually, a single choke 28 of the swinging or variable inductance type may be used without any auxiliary, additive inductance 26, if a component 28 of sufficient inductance is available. Similarly, although the invention, illustrated in terms of a swinging choke whose inductive reactance decreases with increasing current flow therethrough, it will be clear to those skilled in the art that an inductive device whose reactance increases with current flow therethrough could be used with mere repositioning of the range of resonance frequency shift of the inductance capacitance combination 26, 28 and 30 on the other or higher side of the source frequency $f_s$. Moreover, it will be appreciated that a fixed inductance could be utilized with a capacitive device whose reactance changes in required amount as a function of current flow therethrough. Also, although the invention is illustrated, and it is currently believed most conveniently and preferably practiced by use of a series resonant combination in series with one of the power input leads, there would appear to be no reason why a parallel resonant combination might not in some cases be employed either in series with an input power lead or in shunt between the input power leads. It is to be understood, therefore, that such variations and rearrangements of the concept of this invention are contemplated as being within its general scope and should be so regarded, except as may otherwise expressly be provided in the claims that follow.

As will be clear from FIG. 4, where a swinging choke 28 whose inductive reactance decreases with increasing current flow therethrough is employed, the values and characteristics of the components 26, 28 and 30 should be so chosen that the range of variation of the resonance frequency of such combination 26, 28 and 30 will be below the frequency $f_s$ of the power source 10 and so that the portion of the resonance response characteristics which determine the voltage developed across the capacitor 30 will be more or less linear and on the higher frequency slope thereof.

The procedure to be followed in selecting values of components, although probably already apparent to those skilled in the art from the foregoing description of the invention and its manner of functioning, may be further illustrated by an actual example. Assume, therefore, that a source 10 having an output voltage of 115 volts R.M.S. and a frequency of 400 cycles per second is to be coupled to the input terminals 16 and 18 for providing a rectified, direct current output voltage which will remain substantially constant between output terminals 20 and 22 at a value of 250 volts when a load equipment 14 whose current requirements may vary from a minimum of 100 milliamperes to one ampere is coupled with the output terminals 20 and 22. The value of the shunt, output capacitor 40 may first be calculated as equal to the product of twice the desired output voltage in volts and the maximum load current in amperes divided by the product of the source frequency in cycles per second and the square of the peak value of the source voltage in volts. Such calculation yields as a suitable value for capacitor 40 a capacitance of approximately 47 microfarads.

Next, the value of the series input capacitor 30 may be calculated from the fact that such capacitor 30 may suitably be of a value equal to that of the output capacitor 40 reduced by a factor equal to the square of the Q characteristics of the inductance 26—28 to be employed. In practice, the Q of conventionally available inductors 26 and 28 will normally run about 1.5, which results in a reduction factor of 2.25 from the value of the capacitor 40 for determining the value of the capacitor 30. In the example under consideration, this yields a suitable value for the capacitor 30 of about 20 microfarads.

Next, the desired value of the total inductance of the chokes 26 and 28, and any inductive component of the internal impedance of the source 10, for operation of the power supply at the maximum load current to be provided, may be calculated as the reciprocal of the product of the capacitance of the capacitor 30 and the square of the product of 2 pi times the frequency in cycles per second of the output of source 10. This yields a value for the total inductance mentioned of approximately 7.8 millihenrys, which it will be observed, is the minimum value which the entire inductance combination will assume when the load current is at the predetermined maximum.

Next, the desired resonant frequency for the inductance-capacitance combination 26, 28 and 30 (and any inductance included in the internal impedance of the source 10), is determined for minimum load current conditions as equal to twice the frequency of the source output in cycles per second divided by the quantity composed of the reciprocal of the product of the Q of the inductances and the ratio of the desired output voltage at minimum load current to the unregulated output voltage at minimum load current plus the square root of the square of the first mentioned term of such quantity plus four. In the example under consideration, this yields a figure for the desired resonance frequency of the combination 26, 28 and 30 with minimum load current conditions of about 267 cycles per second, which may be related for illustrative purposes to the frequency $f_1$ shown in FIG. 4.

Next, the desired maximum value for the combined inductance of the series resonant combination, which will obtain at minimum load current conditions, may be calculated as the reciprocal of the product of the capacitance of the input capacitor 30 and the square of the product of 2 pi times the desired frequency in cycles per second of the combination 26, 28 and 30 at minimum load current conditions. This yields as a suitable maximum value of inductance, a figure of about 17 millihenrys. It will now be clear that the inductance 28 or the combined inductances of chokes 28 and 26, if the latter is also used as a matter of convenience, together with any inductive component of the internal impedance of the source 10, should be so chosen as to vary between approximately 7.8 millihenrys at a current flow of 1 ampere to approximately 17 millihenrys at a current flow of 100 milliamperes. It will be obvious to those skilled in the art as to how various combinations of inductances 26 and 28 may be employed in combination to achieve the desired values and range where a choke 28 of the given "swing" characteristics is to be employed, or a single swinging choke 28 may simply be provided having the desire characteristics.

From the example given above, those skilled in the art may calculate suitable values for other circuit parameters.

Reference may now be made to the second illustrative embodiment of the invention shown in FIG. 5, where the regulatory means contemplated by the invention are applied to a voltage quadrupling and rectifying power supply circuit. Components in the embodiment of FIG. 5 which are analogous to those of the embodiment of FIG. 1 are similarly numbered and will be understood to have the same characteristics. In the voltage quadrupling circuit of FIG. 5, however, the power lead from input terminal 16 is split after passage through the fixed choke 26 into a pair of branches, one of which is essentially the same as described for the embodiment of FIG. 1 and the other of which includes a series connection of a second swinging choke 50, a second series input capacitor 52, conductive means 54, a second series rectifier device 56, and a conductive means 58 which, in this instance, is coupled by conductive means 60 and 62 to the side of rectifier device 38 opposite conductive means 32 and by conductive means 60 and 64 with the side of capacitor 40 opposite conductive means 38. A second shunt rectifier unit 66 is provided and coupled between the conductive means 24 and 54 and a second shunt capacitor 68 is also provided and is coupled between the conductive means 24 and the conductive means 58.

The operation of the embodiment shown in FIG. 5 is essentially the same as above described for the voltage doubling embodiment of FIG. 1, except that two rectifying and regulating units analogous to that of the embodiment of FIG. 1 are essentially pyramided one upon the other to provide the quadrupled voltage desired. This latter feature of the circuit is, of itself, so well known to those skilled in the art as to require no further explanation.

Although the invention has been illustrated with respect to employment in conjunction with rectifying and voltage doubling or quadrupling type power supply circuits, it will be clear to those skilled in the art that it is by no means so limited. Moreover, particularly in view of the disclosures hereinabove contained, it will be apparent that a number of minor modifications or changes could be made from the exact circuits disclosed for illustrative purposes without departing from the true spirit and intention of the invention.

Accordingly, it is intended and is to be understood that the scope of the invention shall be deemed limited only by the claims that follow.

Having thus described the invention, what is claimed as new and desired to be secured by Letters Patent is:

1. A voltage regulator for use with power supply apparatus having a pair of input terminals adapted for coupling with a source of alternating current power of predetermined frequency, a pair of output terminals adapted for coupling with power consuming load equipment whose voltage requirements are substantially constant and whose current requirements vary within a predetermined range, a first circuit branch coupling one input terminal with one output terminal, a second circuit branch coupling the other input terminal with the other output terminal, and rectifier means coupled in series with said first circuit branch, said voltage regulator comprising a swinging choke; a capacitor; electrically conductive means coupling said swinging choke and said capacitor in series with each other; and electrically conductive means for coupling said series connected swinging choke and capacitor in series with said first circuit branch between said one input terminal and said rectifier means.

2. A voltage regulator as set forth in claim 1, wherein said capacitor is coupled between said swinging choke and said rectifier means.

3. A voltage regulator as set forth in claim 2, wherein is provided a fixed choke, and means for coupling said fixed choke in series with said swinging choke between said one input terminal and said capacitor.

4. A voltage regulator as set forth in claim 2, wherein is provided a second rectifier means, and means for coupling said second rectifier means between said second circuit branch and a point on said first circuit branch between said first-mentioned rectifier means and said capacitor.

5. A voltage regulator for use with voltage doubling power supply apparatus having a pair of input terminals adapted for coupling with a source of alternating current power of predetermined frequency, a pair of output terminals adapted for coupling with power consuming load equipment whose voltage requirements are substantially constant and whose current requirements vary within a predetermined range, a series rectifier device, a first circuit branch coupling one of said input terminals with one of said output terminals and having said series rectifier device coupled therein in series therewith, a second circuit branch coupling the other of said input terminals with the other output terminal, a shunt rectifier device, means coupling said shunt rectifier device between said second circuit branch and a point on said first circuit branch, a shunt capacitor, and means coupling said shunt capacitor between said second circuit branch and a zone of said first circuit branch between said series rectifier device and said one output terminal, said voltage regulator comprising a swinging choke; a fixed, series capacitor; means for coupling said swinging choke in series with said first circuit branch between said one input terminal and said series rectifier device; and means for coupling said fixed series capacitor in series with said first circuit branch between said swinging choke and said series rectifier device.

6. A voltage regulator as set forth in claim 5, wherein is provided a fixed choke, and means for coupling said fixed choke in series with said swinging choke.

7. A voltage regulator for use with voltage quadrupling power supply apparatus having a pair of input terminals adapted for coupling with an alternating current power source of predetermined frequency, a pair of output terminals adapted for coupling with power consuming load equipment whose voltage requirements are substantially constant and whose current requirements vary within a predetermined range, a first series rectifier device, first electrical circuit means coupling one of said input terminals with one of said output terminals and having said first series rectifier device coupled therein in series therewith, second electrical circuit means coupling the other of said input terminals with the other output terminal, a pair of shunt capacitors, third electrical circuit means coupling said shunt capacitors in series with each other and between said second circuit means and a point on said first circuit means, a first shunt rectifier device, fourth electrical circuit means coupling said first shunt rectifier device between a zone of said first circuit means intermediate said one input terminal and said first series rectifier device and a portion of said third circuit means intermediate said shunt capacitors, a second series rectifier device, fifth electrical circuit means coupling said one input terminal with said portion of said third circuit means and having said second series rectifier device coupled therein in series therewith, a second shunt rectifier device, and sixth electrical circuit means coupling said second shunt rectifier device between said second circuit means and a part of said fifth circuit means intermediate said one input terminal and said second series rectifier device, said voltage regulator comprising a first swinging choke; a first series capacitor; electrically conductive means for coupling said first swinging choke in series with said first circuit means between said one input terminal and said first series rectifier device; electrically conductive means for coupling said first series capacitor in series with said first circuit means between said first swinging choke and said first series rectifier device; a second swinging choke; a second series capacitor; electrically conductive means for coupling said second swinging choke in series with said fifth circuit means between one input terminal means and said second series rectifier device; and electrically conductive means for coupling said second series capacitor in series with said fifth circuit means between said second swinging choke and said second series rectifier device.

8. A voltage regulator as set forth in claim 7, wherein is provided a fixed choke coupled in series between said one input terminal means and the interconnection of said first circuit means and said fifth circuit means.

References Cited in the file of this patent

UNITED STATES PATENTS

| | | |
|---|---|---|
| 1,948,704 | Kischer | Feb. 27, 1934 |
| 1,993,914 | Bohm | Mar. 12, 1935 |
| 2,326,465 | Keeler | Aug. 10, 1943 |
| 2,333,211 | Stevens | Nov. 2, 1943 |
| 2,367,625 | Short | Jan. 16, 1945 |
| 2,668,942 | Varela et al. | Feb. 9, 1954 |
| 2,763,827 | Evans | Sept. 18, 1956 |

OTHER REFERENCES

"Analyses of the Voltage-Tripling and Quadrupling Rectifier Circuits," by D. L. Waidelich and H. A. K. Taskin, Proceedings of the IRA, vol. 33, No. 7 (July 1954), pages 449–457 relied on.